United States Patent [19]
Imlach

[11] Patent Number: 5,962,940
[45] Date of Patent: Oct. 5, 1999

[54] HIGH SPECIFIC LOAD CAPACITY RADIAL MAGNETIC BEARING ACTUATOR

[76] Inventor: Joseph Imlach, 460 Falke Ct., Anchorage, Ak. 99504

[21] Appl. No.: 09/010,725

[22] Filed: Jan. 21, 1998

[51] Int. Cl.$^6$ .............................. H02K 7/09; F16C 29/00
[52] U.S. Cl. ........................................................... 310/90.5
[58] Field of Search ............................ 310/90.5; 318/701

[56] References Cited

U.S. PATENT DOCUMENTS

| | | | |
|---|---|---|---|
| 3,365,248 | 1/1968 | Zedekar | 310/90.5 |
| 3,823,990 | 7/1974 | Gillinson | 310/90.5 |
| 4,387,935 | 6/1983 | Studer | 310/90.5 |
| 5,179,308 | 1/1993 | Malsky | 310/90.5 |
| 5,202,598 | 4/1993 | Katsumata | 310/90.5 |
| 5,300,843 | 4/1994 | Lyons et al. | 310/90.5 |

Primary Examiner—Clayton LaBalle
Assistant Examiner—Burton S. Mullins
Attorney, Agent, or Firm—Michael J. Tavella

[57] ABSTRACT

A magnetic bearing that uses a stator element comprised of four poles, one per quadrant. These poles are separated by slots, that are occupied by coils. The poles and coils are structured such that the flux generated by the coils traverses paths in which all flux passes through gaps in two orthogonal axes. In the preferred embodiment, the poles are each formed as a separate section. Coils are then placed on the poles and the poles assembled to form the stator assembly.

18 Claims, 6 Drawing Sheets

HIGH SPECIFIC LOAD CAPACITY RADIAL MAGNETIC BEARING ACTUATOR

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

The present invention relates to the field of magnetic bearing or suspension systems. More specifically, the invention is directed towards a high specific load capacity, high efficiency radial active magnetic bearing actuator with improved stability.

2. Description of Related Art

Active Magnetic Bearing (AMB) systems are well known in the art. These devices include a stationary component known as a stator and a rotating or translating component known as a rotor. One of these components, usually the stator, is formed by a number of pole pieces, each of which has a coil wrapped around it to generate and control a magnetic field that passes between the stator and the rotor. The currents in the coils are adjusted by an electronic control system, which varies the current levels in response to a measurement of the shaft displacement. The rotor can thus be supported in space and its position controlled by use of the magnetic field.

These bearings have highly desirable characteristics compared to other types of bearings, including low power losses, the absence of frictional contact, and the absence of a lubricating medium. One of the major limitations of this type of bearing, however, is the comparatively low specific load capacity. Specific load capacity is the load supported per unit bearing area, usually measured on the rotor. The lower the specific load capacity the larger the rotor needs to be to support a given load.

The limits on the specific load capacity of AMBs arise from two factors: the maximum flux density of the magnetic material used, and the actual surface area that can be used to provide flux to the rotor. The more flux the material can carry without saturating, the higher the resulting specific load. The ease with which a magnetic material can carry flux is referred to as the material's permeability. It is common practice to specify the magnetic permeability of a material as a relative permeability, referenced to the permeability of air. In this notation, air has a relative permeability of 1 and magnetic materials have a permeability of 2000 or more. Thus it takes 2000 times more magnetomotive force to generate a given flux density in a magnetic circuit composed of air than if that circuit were composed of a magnetic material with a relative permeability of 2000. All magnetic materials have a maximum flux density, above which their relative permeability decreases rapidly, approaching 1 in the limit. For a given magnetic material, the specific load capacity of the bearing will be determined by the area of the magnetic material available to deliver flux to the rotor. The present invention addresses this factor of maximizing the available area.

Radial AMB stators are constructed of a series of discrete, radially directed, magnetic poles situated around the periphery of a cylindrical rotor. In general, each pole has a coil of conductive material wrapped around the sides of the pole through which a current flows, generating and controlling magnetic flux. The poles are separated from each other by slots, that define the pole pieces and accommodate the coils. The poles are further separated from the rotor by a gap. Magnetic flux traverses the gap that separates each pole from the rotor, generating an attractive force between the pole and the rotor. This force is proportional to both the planar projections of the pole piece area and the square of the flux density in the gap and is in the direction of the pole piece. No force is generated in the slot areas.

In the current state-of-the-art magnetic bearings, radial AMB stators are divided into quadrants, with each quadrant containing two or more pole pieces that form one or more closed flux paths. Each flux path can be described as starting at the face of one pole. It then crosses from the stator pole to the rotor across one gap, travels through a portion of the rotor, then travels across another gap to an adjacent stator pole in the same quadrant. The flux path is then closed by returning through the stator to the original pole piece.

The resultant force for each quadrant can be found by determining the vector sum of the forces acting on each pole in the quadrant. The forces in opposite quadrants oppose each other in a pull-pull arrangement. Closed loop servo control is required to balance this arrangement and provide stable support in each axis. Such a control system usually consists of three components: a sensor, a signal conditioner, and a power amplifier. The sensor measures the position of the rotor portion of the actuator. The signal conditioner then compares the measured position to the pre-determined desired position of the rotor, and calculates the electric currents required to correct the position. The power amplifiers then adjust the currents in the actuator coils according to the instructions from the signal conditioner.

To enhance the stability of this servo control system, and provide an approximately linear force response, an equal bias flux is generated in each quadrant of the bearing. This bias flux can be generated by a bias current in the coils or, alternatively, by permanent magnets as will be discussed below. In both cases, the forces are controlled by directing a control current through the coils, which generates a control flux. Although this improves the linearity of the force response as a function of control current, as will be described below, the force response of prior art bearings is a highly non-linear function of the displacement of the rotor.

Two basic types of radial magnetic bearing actuator are common within the industry, and are representative of the state-of-the-art: planar (heteropolar) configurations and homopolar configurations.

FIG. 1 is an axial view of a magnetic bearing actuator that is representative of heteropolar bearings in the prior art. The bearing 100 consists of a stator element 120 and a rotor element 130. The stator element is fixedly mounted in a housing, not shown. The rotor element is fixedly attached to a shaft, not shown. The rotor and shaft assembly are rotatable or axially translatable relative to the stator and housing assembly. The stator is composed of eight pole pieces of which the upper two 141a, 141b and lower two 143a, 143b are identified in the figure. The poles are arranged in pairs, with each pair of poles occupying a quadrant of the bearing. Each pole has a coil wrapped around it 151a, 151b, 153a, 153b, that are also arranged in pairs and that are connected in series such that the flux generated by each coil in the pair is additive. Through each coil, a current flows that generates flux that flows in a path 161, 163 through the magnetic circuit. All flux generated by each pair of coils follows only one path. Each flux path is contained within a single bearing quadrant. For example, the flux in path 161 is contained in the top quadrant of the bearing. This flux traverses across gaps 171a and 171b, and in so doing generates a net upward force on the rotor. As the flux crosses gap 171a it generates a force proportional to the area of the pole piece 141a, and in the direction from the center of the rotor to the center of the pole piece. As the flux crosses gap 171b it generates a force proportional to the area of the pole piece 141b, and in the direction from the center of the rotor to the center of the pole piece. The horizontal components of these vector forces cancel each other, while the vertical components of the vector forces are additive, resulting in the upward force. No net vertical force is generated on the rotor near the coil slots 180, nor by the horizontal pole pieces. A measure of the efficiency of the bearing is the ratio of the maximum amount of force that can be generated in any axis to the force that would be generated if the full rotor diameter were exposed to the same maximum flux density, in the direction of the axis. With this measure, the efficiency of the bearing shown in FIG. 1 is approximately 40%, that is typical of this configuration.

The amount of flux that travels in any path, e.g., 161, is proportional to the magnetomotive force driving the flux through the path and inversely proportional to the reluctance of the path. The magnetomotive force in an electromagnetic circuit, such as shown in FIG. 1, is in turn proportional to the current flowing through the coils, 151a and 151b. The reluctance of the magnetic circuit, 161 is roughly proportional to the sum of the thickness of the gaps, 171a and 171b. A similar analysis can be made of each of the other flux paths. In this configuration, if the thickness of the gap when the rotor is centered is denoted G and the rotor 130 is displaced upward a distance x while the currents in the coils remain constant, the amount of flux in the upper path 161 is increased by a factor of approximately (G)/(G−x), while the flux in the lower path 163 is decreased by a factor of (G)/(G+x). Because force is proportional to the square of the flux, there would be a net increase in upward force, resulting from the upward displacement of the rotor. This phenomenon is know as the negative positional stiffness of an active magnetic bearing, and results in bearing instability. Note that as the upward displacement, x, approaches the maximum value, G, the flux in the top circuit tends towards infinite values. This trend is limited only by the saturation of the magnetic material. Thus the negative stiffness of the magnetic bearing increases rapidly with increasing displacements and is, therefore, a non-linear function of displacement of the rotor. See FIG. 4.

This negative stiffness is counteracted by a servo control system, described earlier, which controls the current flowing in the coils in response to measured rotor position. When the rotor moves upward, a measurement device detects this motion, and decreases the current in the upper coils by an amount more than that required to counter the decreased reluctance of the upper circuit, resulting in a net decrease of flux in circuit 161. Simultaneously, the current in the bottom coils 153a, 153b is increased by an amount more than that required to counter the increased reluctance of the bottom circuit 163, resulting in a net increase in the flux in the bottom circuit. The result is a downward, restoring, force in response to the upward displacement of the rotor. At the extreme values of displacement, however, the majority of the current variation in the coils is required to offset the changes in reluctance. This is due to the high degree of non-linearity in the positional stiffness that complicates the control algorithms required of the servo-control mechanism.

Another feature of the prior art bearing shown in FIG. 1 is that as a point on the surface of the rotor rotates through a full revolution, it will be exposed to eight flux reversals. Each reversal of flux induces both eddy current and hysteretic losses in the rotor. These losses increase the power consumption of the bearing and cause heating in the rotor. Both of these effects are generally undesirable.

The prior art configuration shown in FIGS. 2a and 2b represents an improvement in this regard. In this configuration, no flux reversals are encountered, and rotor power loss is minimized. In this configuration, the bearing 200 is composed of a stator 220 and a rotor 230. The stator element is fixedly mounted in a housing, not shown. The rotor element is fixedly attached to a shaft, not shown. The rotor and shaft assembly are rotatable or axially translatable relative to the stator and housing assembly. The stator is composed of eight poles, four of which 241a, 242a, 242a, 244a are visible in FIG. 2a. The other four pole pieces are axially offset from those illustrated in FIG. 2a, as is shown in the vertical cross section of FIG. 2b, in which it is seen that the stator 220 is further divided into a front section 220a and a rear section 220b that are identical in construction. These sections are separated axially by an axially magnetized permanent magnet ring 290 and, in some cases, spacers of a soft magnetic material 280. The permanent magnets generate a bias flux that follows paths in each quadrant similar to those shown for the upper quadrant bias path 260a and the lower quadrant bias path 260c. It is noted that the bias flux flowing in the front section 220a all flows from the stator to the rotor, while that flowing in the rear section 220b all flows from the rotor to the stator. Thus each of the poles in the front section is biased as a north pole, while each of the poles in the rear section is biased as a south pole. This is the reason that no flux reversals are encountered by the rotor, and gives rise to the "homopolar" designation.

In this configuration the poles are arranged in axial pairs (e.g., 241a, 241b), with each pair occupying one bearing quadrant. Each pole has a coil 251a, 252a, 253a, 254a wrapped around it with the front and rear coils (e.g., 251a, 251b) of each pair of coils connected in series. Further, each coil pair is connected in series with the pair directly opposite. For example, the upper coil pair 251a, 251b is connected in series with the lower coil pair 253a, 253b. These coils are connected such that when the current flows in one direction, the flux flowing in path 261 is added to the bias flux 260a in the top quadrant and subtracted from the bias flux 260c in the bottom quadrant. The horizontal axis is connected and the flux path described in the same way.

The configuration shown in FIGS. 2a and 2b also has a negative positional stiffness. Again, if the thickness of the gaps when the rotor is centered is denoted G and the rotor 230 is then displaced upward a distance x while the currents in the coils remain constant, the flux in the upper bias path 260a is increased by a factor of (G)/(G−x), while the flux in the lower path 260c is decreased by a factor of (G)/(G+x). Again, a control current must be driven through the coils to generate a restoring force. The results of the highly non-linear negative position stiffness on bearing stability are similar to those found in the heteropolar bearing.

The maximum load capacity of bearings of this configuration is proportional to the areas under the pole pieces. The flux in gaps 271a and 271b both generate vertically upward forces proportional to the projected area of the pole pieces. The total upward force is the sum of these two forces. No vertical force is generated on the rotor near the coil slots, nor by the horizontal pole pieces. Additionally, no vertical force is generated in the area under the axial space 280 allowed for the coils, magnets, and spacers. For this configuration, the efficiency of the bearing illustrated is approximately 50%. That is typical of homopolar bearings.

The manufacturing process for this type of bearing is significantly more complicated than for the heteropolar bearing. The inclusion of permanent magnets requires care in the handling and assembly of the bearing during manufacturing. In addition the presence of the magnets in the bearings requires additional care in the assembly and handling of the machine into which the bearings are placed.

In prior art configurations shown in FIGS. 1 and 2, a significant portion of the rotor surface area is opposite a portion of the stator that provides no flux, either coil slots or permanent magnet spacing gaps.

BRIEF SUMMARY OF THE INVENTION

It is an object of the present invention to provide a magnetic bearing stator that maximizes the specific load capacity of the bearing for any given material.

It is another object of the present invention to provide a magnetic bearing stator that utilizes simple planar flux circuits, without permanent magnet materials.

It is another object of the present invention to provide a magnetic actuator with a decrease in the non-linearity of the negative positional stiffness with displacement, relative to the prior art.

An apparatus and method to accomplish these purposes use a stator element comprised of four poles, one per quadrant. These poles are separated by slots, roughly triangular in section, that are occupied by coils. The poles and coils are structured such that the flux generated by the coils traverses paths in which all flux passes through gaps in two orthogonal axes. In the preferred embodiment, the poles are each formed as a separate section. Coils are then placed on the poles and the poles assembled to form the stator assembly.

DETAILED DESCRIPTION OF THE INVENTION

Figure 1:
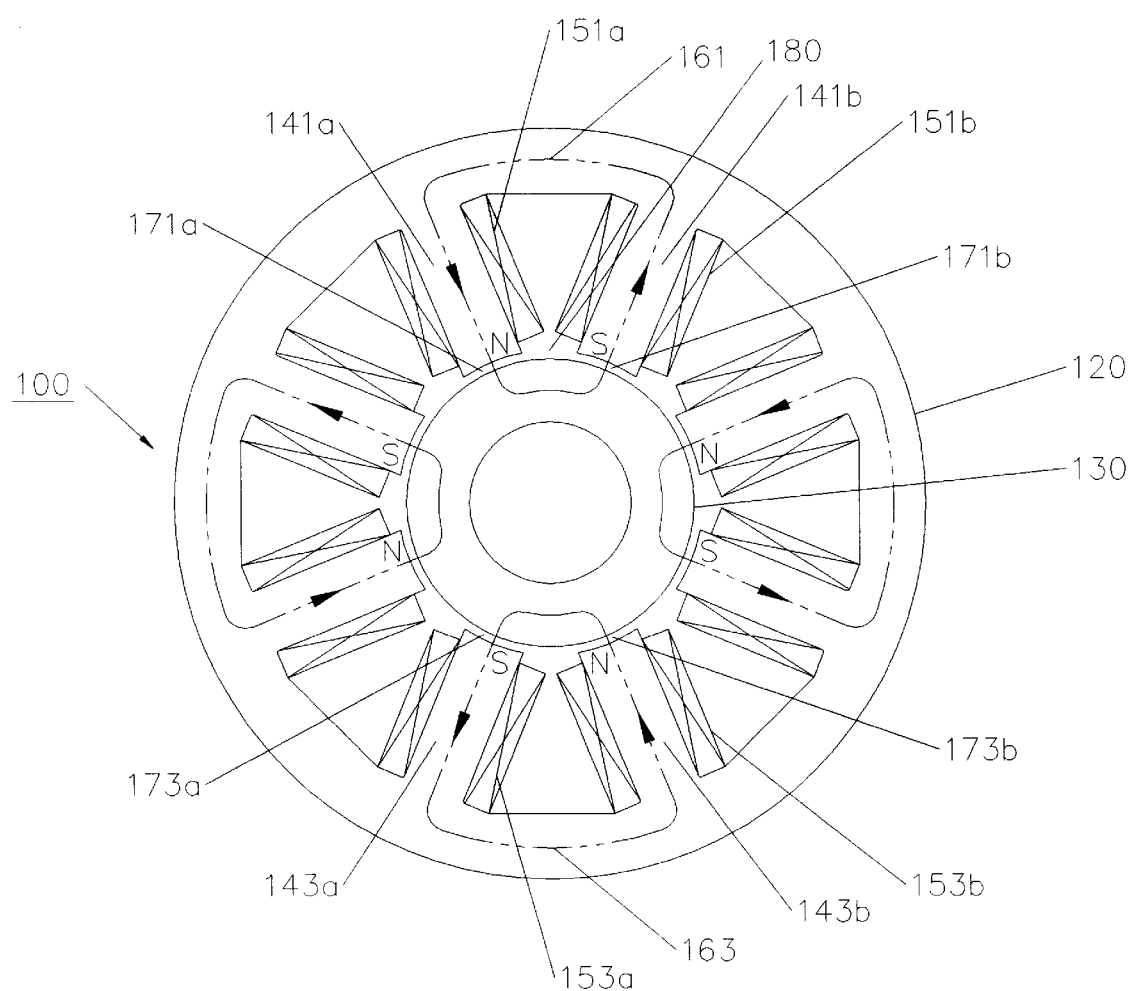
FIG. 1 is an axial view of a magnetic bearing actuator that is representative of heteropolar bearings as prior art.

Referring now to the drawings, FIG. 3a is an axial view of a magnetic bearing actuator according to the current invention. FIG. 3b is a vertical cross sectional view of the same actuator. The bearing 300 consists of a stator element 320 and a rotor element 330. The stator element is fixedly mounted in a housing, not shown. The rotor element is fixedly attached to a shaft, not shown. The rotor and shaft assembly are rotatable or axially translatable relative to the stator and housing assembly.

The stator is further comprised of only four pole pieces 341, 342, 343, 344, each located in a separate quadrant on the bearing (upper, left, bottom, and right quadrants respectively). This configuration is fundamentally different from bearings of the prior art in which each quadrant of the bearing contains one or more complete magnetic circuits and at least one pair of poles. In the current invention, each quadrant contains only a portion of a magnetic circuit and a single magnetic pole. For example, in FIG. 3a, the upper quadrant contains only one pole 341, which is illustrated as a north pole N. The flux paths 361 and 362, which pass from this pole to the rotor, return to the stator through poles 342 and 344 in the left and right quadrants, respectively. These poles must be opposite that of 341, and are illustrated as south poles S. Because all the useful flux in the bearing crosses two orthogonal gaps the reluctance of each flux path is less dependent on rotor motion in any one axis.

Around each pole piece is wound a coil 351, 352, 353, 354. Through each coil, a current flows that generates flux in the magnetic circuit. The flux generated by each coil is divided into two paths. For example, the current in coil 351 generates flux that flows in paths 361 and 362. Both paths pass through pole piece 341 and across gap 371, in the upper quadrant, to the rotor 330. The flux paths then diverge, with path 361 returning to the stator 320 across gap 374 to pole piece 344 in the left quadrant orthogonal to the originating quadrant, while flux path 362 returns to the stator 320 across gap 372 to pole piece 342 in the right quadrant also orthogonal to the originating quadrant. Thus the flux generated by the coils in the vertical quadrants also travels through the horizontal quadrants, essentially providing additional bias flux to the horizontal axis. The other coils generate flux paths that can be similarly described, with the flux generated by the horizontal coils contributing to the flux in the vertical axis. In prior art bearings, flux generated in the vertical axis contributed to forces only in the vertical axis. Similarly, flux generated in the horizontal axis contributed only to forces in the horizontal axis.

Figure 2:
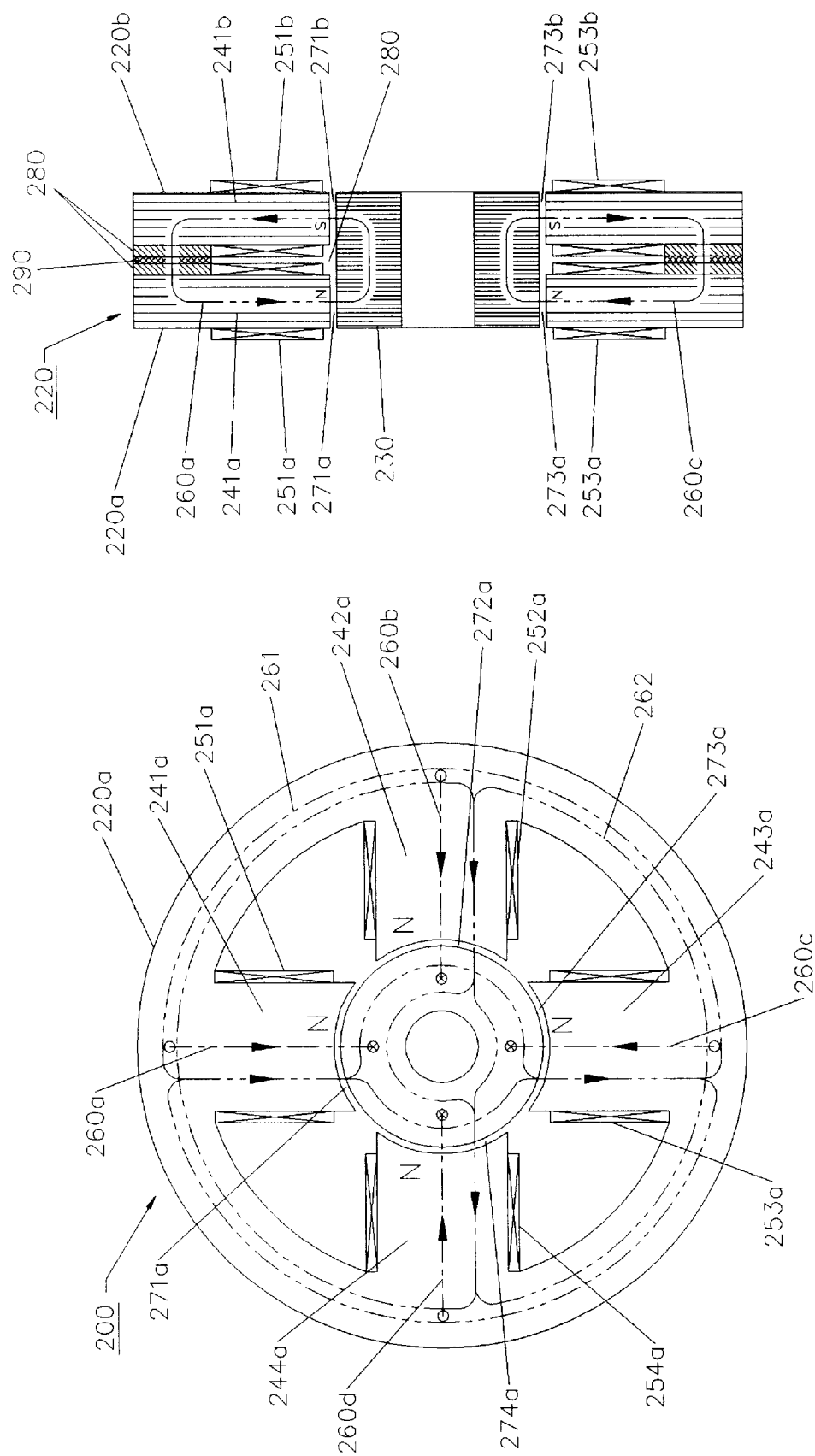
FIG. 2a is an axial view of a magnetic bearing actuator that is representative of homopolar bearings as prior art.
FIG. 2b is a vertical cross-sectional view of a magnetic bearing actuator that is representative of homopolar bearings as prior art.
Figure 3:
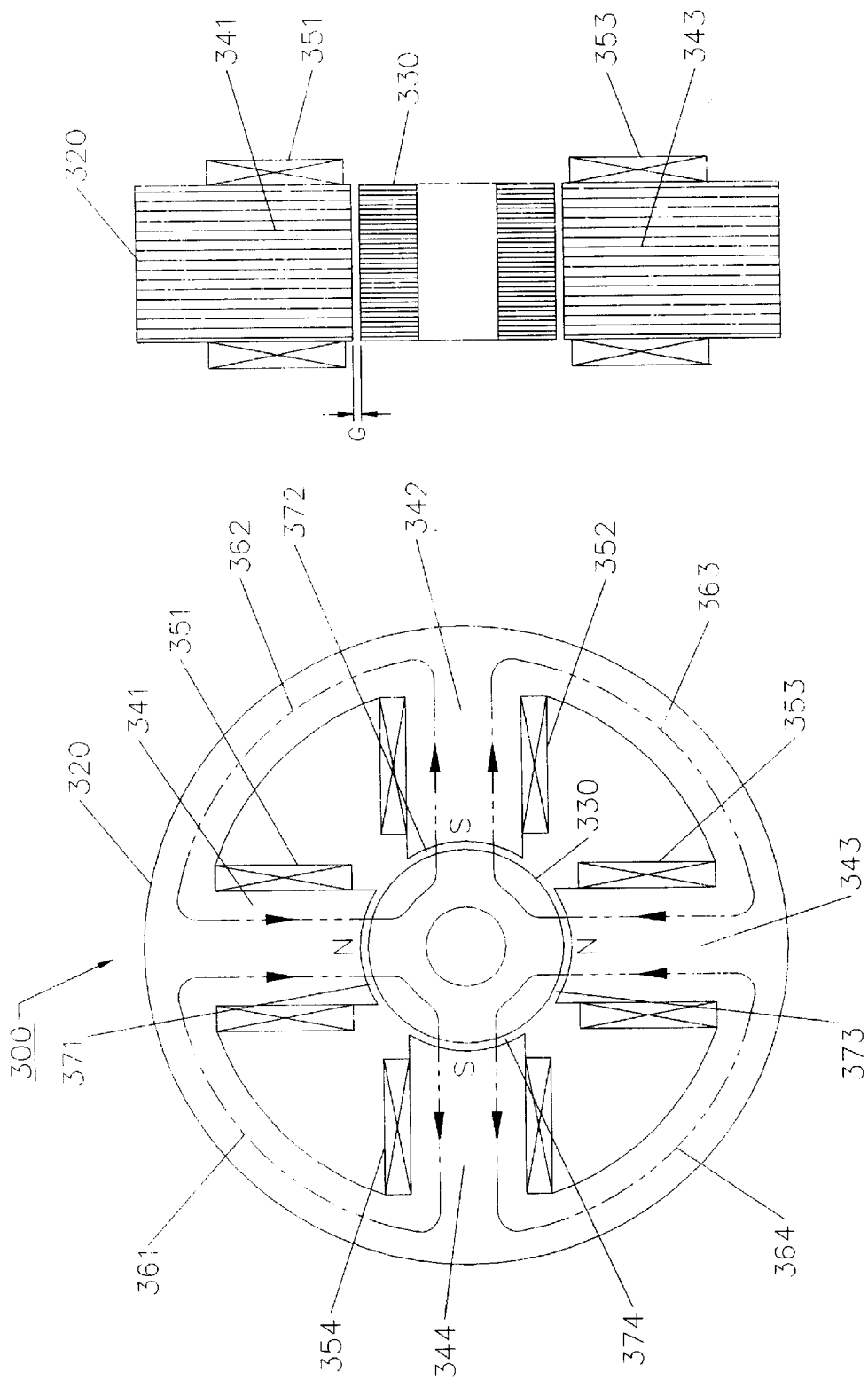
FIG. 3a is an axial view of a magnetic bearing actuator according to the current invention.
FIG. 3b is a vertical cross sectional view of a magnetic bearing actuator according to the current invention.

The configuration of the present invention shown in FIG. 3 is advantageous over the prior art in several ways. First, the percentage of projected rotor area that is directly opposite a pole piece is much higher in this configuration than in the prior art configurations shown in FIGS. 1, 2a, and 2b. From FIG. 3b it is apparent that all the axial length is used to provide force. From FIG. 3a it is evident that the flux in gap 371 will generate a directly vertical force. Only the areas under the two coil slots, and the areas utilized by the horizontal pole pieces generate no vertical force. For the bearing shown in FIG. 3, the efficiency is approximately 60%.

Secondly, because this bearing has only one pole per quadrant the rotor is subject to only four flux reversals per revolution, as opposed to eight reversals per revolution in the configuration shown in FIG. 1. This will reduce the power loss due to eddy currents and hysteresis in the rotor.

Thirdly, as a result of the sharing of flux between axes, the destabilizing negative stiffness of this configuration will be less non-linear than that in the configurations shown in FIGS. 1, 2a and 2b. In the configuration shown in FIGS. 3a and 3b, if the normal gap distance is denoted G and the rotor is again moved upward a distance x while the currents remain constant, it is seen that the flux in paths 361 and 362 is increased by approximately (2*G)/(2*G−x) because the displacement only effects gap 371. The reluctances due to gaps 372 and 374 are not diminished by a vertical displacement. For similar reasons, the flux in the lower paths 363, 364 is decreased by only a factor (2*G)/(2*G+x). This change in flux with displacement will generate a proportional force, again creating a negative stiffness. It is noted however that as the displacement, x, approaches its maximum value, G, the flux in the upper circuit approaches 2 times the nominal flux value, rather than infinity as in the prior art. The negative positional stiffness is therefore much less non-linear for large displacements. Thus the bearing according to the current invention will be easier to stabilize.

Figure 4:
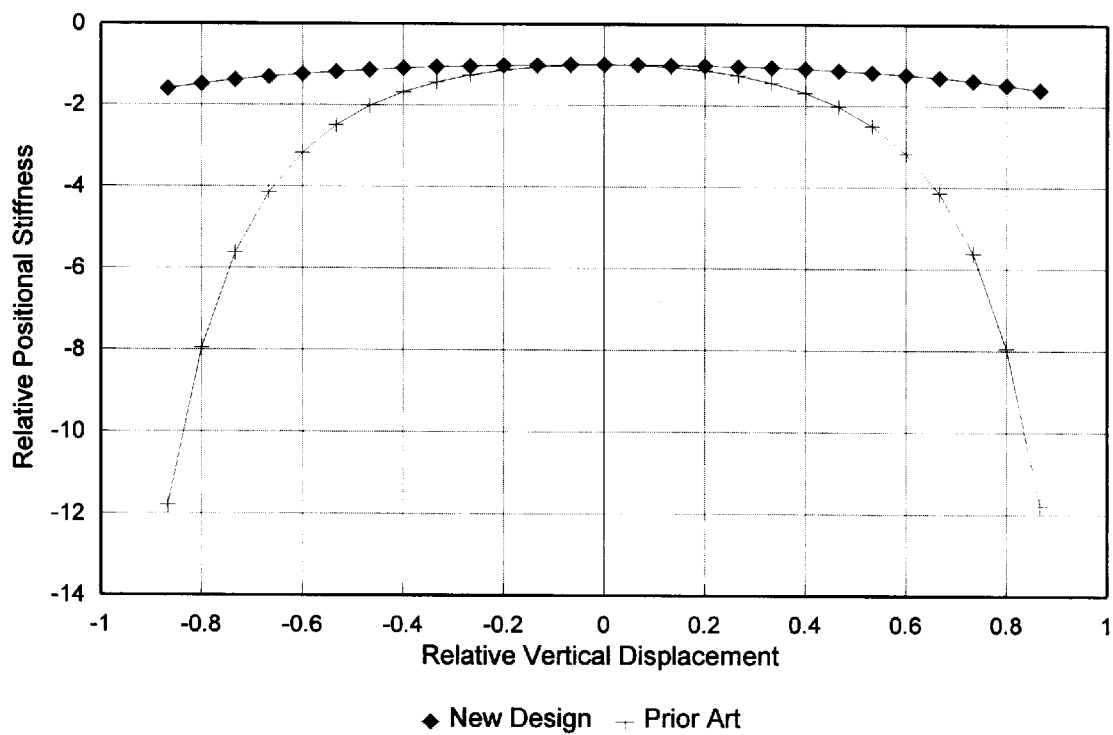
FIG. 4 is a graph comparing the destabilizing negative postional stiffness of the prior art actuators with the current invention.

This can be seen more plainly in FIG. 4, which contains plots of the destabilizing negative positional stiffness for both a bearing according to the prior art and one according to the new invention. It is readily apparent that as the shaft moves away from the centered position, the positional stiffness increases in magnitude much more rapidly for bearings of the prior art. Thus, more control effort is required for these bearings to maintain stability than for bearings according to the present invention. This benefit can be applied in two ways. First, for bearings of a given gap length G, the new bearing can be used to increase the stability of the bearing under large relative displacements. Secondly, in the case of bearings where the given displacement is small compared to the nominal bearing gap, the nominal bearing gap can be decreased. This allows smaller, less inductive, coils to be used to generate the same bearing flux density. These less inductive coils can be used to either decrease the power amplifier voltage requirements, which can reduce the cost of the electronics, or increase the bearing bandwidth, resulting in an improvement in bearing performance.

Figure 5:
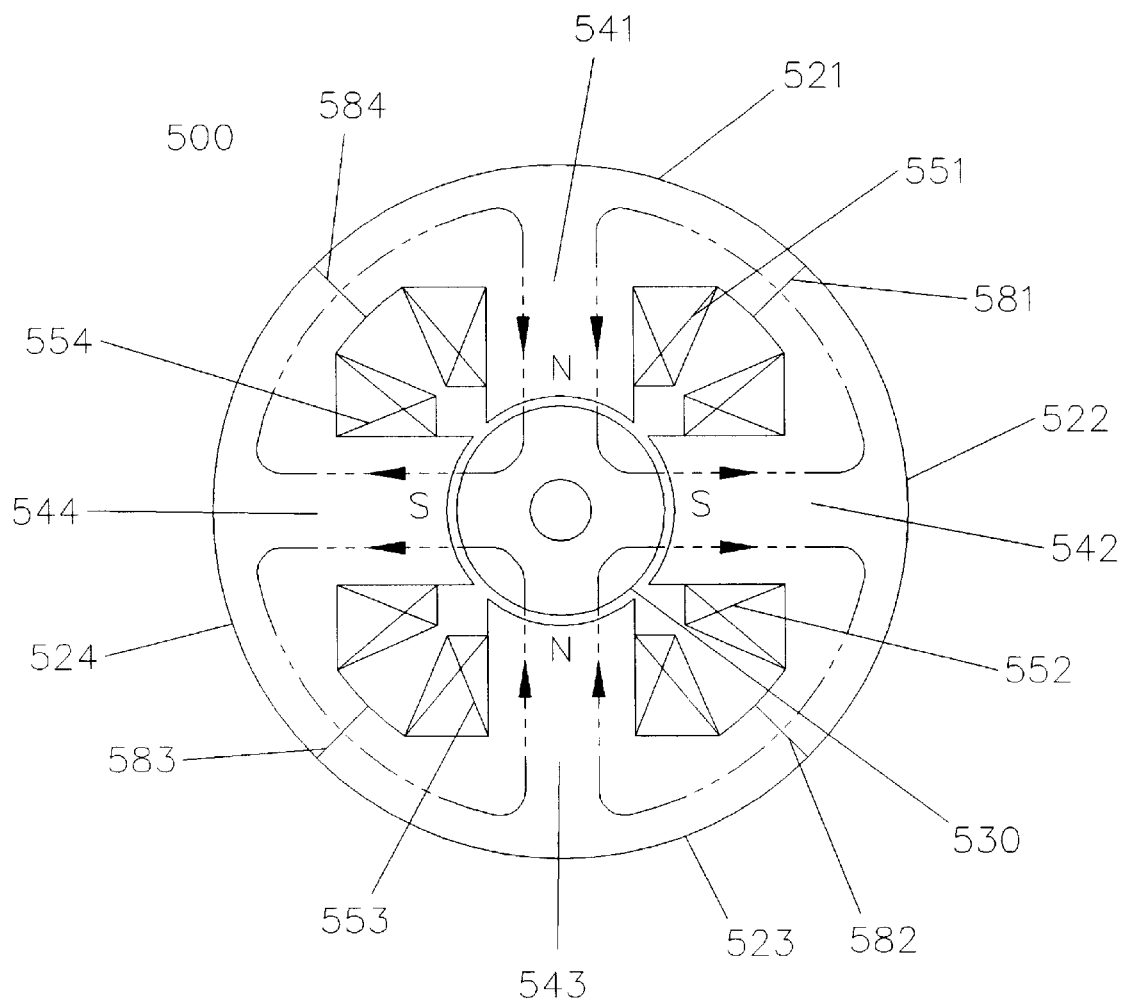
FIG. 5 is an axial view of an embodiment of a magnetic bearing actuator according to the current invention, which further allows maximum utilization of the available bearing area.

FIG. 5 is an axial view of an embodiment of the magnetic bearing actuator according to the current invention that further allows maximum utilization of the available bearing area as disclosed more fully in my co-pending application entitled "Method of Making a High Specific Load Capacity Radial Magnetic Bearing Actuator" and filed on Jan. 9, 1998, Ser. No. 09/010,869, the contents of which are incorporated herein by reference. This improved construction further increases the specific load capacity of the magnetic bearing. The bearing 400 consists of four stator sections 421, 422, 423, 424 and a rotor element 430. Each stator section contains one pole piece 441, 442, 443, 444. Around each pole piece is wound a coil 451, 452, 453, 454 that can be shaped in a manner that utilizes the majority of the open space between pole pieces. In construction, the coils would be assembled onto the pole pieces first, and then the four pole pieces would be brought together. The pole pieces would then be attached to each other by use of a housing or an assembly ring, not shown.

Because the slots between pole pieces no longer need to be wide enough to insert the coils through, this method of construction allows the pole piece gaps 471, 472, 473, 474 to occupy approximately the entire quadrant of the rotor surface. The efficiency of this configuration approaches 70.7%, the theoretical maximum.

Figure 6:
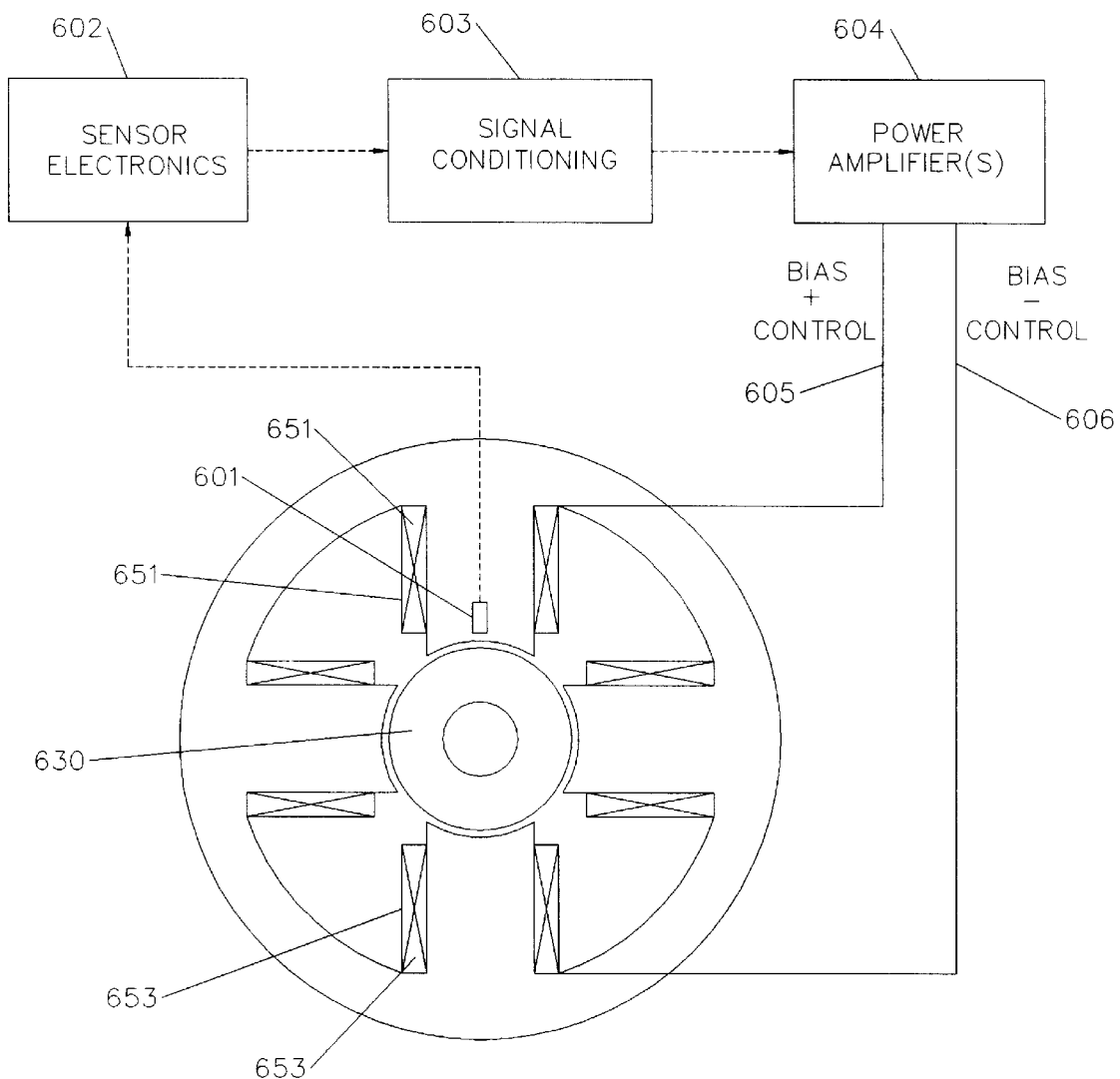
FIG. 6 is an axial view of a magnetic bearing system according to the current invention showing a schematic configuration of a control system.

FIG. 6 illustrates the type of control system that is required to stabilize the actuator and produce bearing characteristics. Such systems are well known in the art, but their application to the current invention should be made clear. The servo control system for the vertical axis consists of a sensor 601 and associated sensor electronics 602; a signal conditioning means 603 and one or more power amplifiers 604. The sensor 601 and sensor electronics 602 measures the vertical position of the rotor 630. The signal conditioner 603 compares the sensor electronics output to a desired reference value and determines appropriate corrections to the coil currents in the form of a control current. The power amplifier(s) direct the requested currents through the leads 605 and 606 to the coils 651 and 653 respectively. One coil (e.g., 651) receives a bias current plus the control current, while the opposite coil (e.g., 653) receives the bias current minus the control current.

In some systems that have relatively large diameter rotors, the configuration illustrated in FIGS. 3a, 3b, and 4 may be impractical. This is because, for bearings in which the saturation flux density is the same in the stator and rotor, the radial dimension of the rotor section of the bearing needs to be approximately one half the width of the pole pieces. In cases that require a large diameter rotor, a configuration that utilizes a high flux material for the rotor component may be advantageous. High flux materials, for example Hiperco Alloy 27HS produced by Carpenter Technology of Reading Pa., have a saturation flux density approximately 67% higher than normal silicon irons. A rotor made of these materials can therefore be significantly smaller than a rotor made of silicon iron and still carry the same amount of flux.

It is noted that the above descriptions have referenced configurations in which the actuator axes have been oriented in a vertical and a horizontal direction. It will be appreciated that these axes can be rotated to any orientation without detracting from the performance of the system.

The present disclosure should not be construed in any limited sense other than that limited by the scope of the claims having regard to the teachings herein and the prior art being apparent with the preferred form of the invention disclosed herein and that reveals details of structure of a preferred form necessary for a better understanding of the invention and may be subject to change by skilled persons within the scope of the invention without departing from the concept thereof.

I claim:

1. A magnetic bearing system comprising:
    a) a stator portion, being spatially divided into four quadrants;
    b) a rotating portion, that rotates in relation to said stator portion, said rotating portion being positioned with relation to said stator portion so that a gap is formed in each quadrant;
    c) a bearing means between said stator portion and said rotating portion to stabilize the axial and radial positions thereof, said bearing means including a magnetic system having four poles, wherein the four poles are positioned about said rotating portion such that there is one pole per quadrant about said rotating portion, and further wherein said poles are separated by a plurality of slots;
    d) a plurality of electrical coils, said coils generating flux, and being positioned with said slots and being formed about said poles, wherein said poles and coils are formed such that the flux generated by each coil traverses a path in which all the flux of a given coil passes through the gaps existing in adjacent quadrants.

2. The magnetic bearing system of claim 1 further comprising a means for controlling the flux generated in said electrical coils.

3. The magnetic bearing system of claim 1 wherein said poles are formed at least partially of a magnetic material.

4. The magnetic bearing system of claim 1 wherein said electrical coils have a cross-sectional geometry.

5. The magnetic bearing system of claim 4 wherein said cross-sectional geometry of said electrical coil is rectangular.

6. The magnetic bearing system of claim 4 wherein said cross-sectional geometry of said electrical coil is trapezoidal.

7. A magnetic bearing system comprising:
   a) a stator portion, being spatially divided into four quadrants;
   b) a rotating portion, that rotates in relation to said stator portion, said rotating portion being positioned with relation to said stator portion so that a gap is formed in each quadrant;
   c) a bearing means between said stator portion and said rotating portion to stabilize the axial and radial positions thereof, said bearing means including a magnetic system having four pole systems, wherein the four pole systems are positioned about said rotating portion such that there is one pole per quadrant about said rotating portion, and further wherein said poles are separated by a plurality of slots, and further such that two of the quadrants are parallel to a first axis and two of the quadrants are parallel to a second axis that is perpendicular to the first axis; and
   d) a plurality of electrical coils, said coils generating flux, and being positioned with said slots and being formed about said poles, wherein said poles and coils are formed such that the flux generated by each coil traverses a path in which all the flux of a given coil passes through the gaps existing in adjacent quadrants.

8. The magnetic bearing system of claim 7 further comprising a means for controlling the flux generated in said electrical coils.

9. The magnetic bearing system of claim 7 wherein said poles are formed at least partially of a magnetic material.

10. The magnetic bearing system of claim 7 wherein said electrical coils have a cross-sectional geometry.

11. The magnetic bearing system of claim 10 wherein said cross-sectional geometry of said electrical coil is rectangular.

12. The magnetic bearing system of claim 10 wherein said cross-sectional geometry of said electrical coil is trapezoidal.

13. A magnetic bearing system comprising:
   a) a stator portion, being spatially divided into four 90 degree quadrants;
   b) a rotating portion, that rotates in relation to said stator portion, said rotating portion being positioned with relation to said stator portion so that a gap is formed in each 90 degree quadrant;
   c) a bearing means between said stator portion and said rotating portion to stabilize the axial and radial positions thereof, said bearing means including a magnetic system having four pole systems, wherein the four pole systems are positioned about said rotating portion such that there is one pole per 90 degree quadrant about said rotating portion, and further wherein said poles are separated by a plurality of generally triangular slots, and further such that two of the 90 degree quadrants are parallel to a first axis and two of the 90 degree quadrants are parallel to a second axis that is perpendicular to the first axis; and
   d) a plurality of electrical coils, said coils generating flux, and being positioned with said generally triangular slots and being formed about said poles, wherein said poles and coils are formed such that the flux generated by each coil traverses a path in which all the flux of a given coil passes through the gaps existing in adjacent 90 degree quadrants.

14. The magnetic bearing system of claim 13 further comprising a means for controlling the flux generated in said electrical coils.

15. The magnetic bearing system of claim 13 wherein said poles are formed at least partially of a magnetic material.

16. The magnetic bearing system of claim 13 wherein said electrical coils have a cross-sectional geometry.

17. The magnetic bearing system of claim 16 wherein said cross-sectional geometry of said electrical coil is rectangular.

18. The magnetic bearing system of claim 16 wherein said cross-sectional geometry of said electrical coil is trapezoidal.

* * * * *